United States Patent [19]

Bailly et al.

[11] Patent Number: 5,202,385
[45] Date of Patent: Apr. 13, 1993

[54] POLYMER MIXTURE HAVING AROMATIC POLYCARBONATE, POLYESTER AND THERMOPLASTIC ELASTOMER, ARTICLE FORMED THEREFROM

[75] Inventors: Christian M. E. Bailly, Kalmthout, Belgium; Robertus E. de Jong, La Bergen op Zoom, Netherlands

[73] Assignee: General Electric Company, Pittsfield, Mass.

[21] Appl. No.: 492,522

[22] Filed: Mar. 6, 1990

[30] Foreign Application Priority Data

Mar. 7, 1989 [NL] Netherlands .................. 8900550

[51] Int. Cl.$^5$ .................. C08L 67/02; C08L 69/00
[52] U.S. Cl. .................. 525/425; 525/64; 525/66; 525/67; 525/411; 525/433; 525/434; 525/439; 525/440
[58] Field of Search .................. 525/411, 425, 439

[56] References Cited

U.S. PATENT DOCUMENTS

| | | | |
|---|---|---|---|
| 3,169,121 | 2/1965 | Goldberg | 260/47 |
| 3,864,428 | 2/1975 | Nakamura et al. | 260/873 |
| 3,907,926 | 9/1975 | Brown et al. | 260/860 |
| 4,001,184 | 1/1977 | Scott | 260/47 XA |
| 4,034,016 | 7/1977 | Baron et al. | 260/858 |
| 4,044,073 | 8/1977 | Baron et al. | 260/860 |
| 4,125,572 | 11/1978 | Scott | 260/860 |
| 4,131,575 | 12/1978 | Adelmann et al. | 260/17.4 R |
| 4,141,927 | 2/1979 | White et al. | 260/857 PA |
| 4,180,494 | 12/1979 | Fromuth et al. | 260/40 R |
| 4,186,257 | 1/1980 | Blahak et al. | 521/159 |
| 4,203,887 | 5/1980 | Goedde et al. | 260/40 R |
| 4,228,249 | 10/1980 | Blahak et al. | 521/159 |
| 4,279,801 | 7/1981 | Kramer et al. | 260/40 R |
| 4,323,657 | 4/1982 | Mazanek | 521/116 |
| 4,332,855 | 6/1982 | Zingheim et al. | 428/379 |
| 4,539,370 | 9/1985 | Nouvertne et al. | 525/67 |
| 4,544,734 | 10/1985 | McCready | 528/288 |
| 4,556,688 | 12/1985 | McCready et al. | 525/33 |
| 4,556,705 | 12/1985 | McCready | 528/289 |
| 4,587,272 | 5/1986 | Avakian et al. | 521/86 |
| 4,657,973 | 4/1987 | Endo et al. | 525/67 |
| 4,900,784 | 2/1990 | Tabankia et al. | 525/67 |

FOREIGN PATENT DOCUMENTS

| | | |
|---|---|---|
| 850419 | 1/1977 | Belgium . |
| 0048483 | 3/1982 | European Pat. Off. . |
| 0102115 | 3/1984 | European Pat. Off. . |
| 0125739 | 11/1984 | European Pat. Off. . |
| 0133236 | 2/1985 | European Pat. Off. . |
| 0150454 | 8/1985 | European Pat. Off. . |
| 0191283 | 8/1986 | European Pat. Off. . |
| 0192065 | 8/1986 | European Pat. Off. . |
| 0248352 | 12/1987 | European Pat. Off. . |
| 1431916 | 4/1976 | United Kingdom . |
| 1560296 | 6/1980 | United Kingdom . |

Primary Examiner—Patricia A. Short
Attorney, Agent, or Firm—Andrew C. Hess

[57] ABSTRACT

The invention relates to polymer mixtures which comprise an aromatic polycarbonate, a polyester, and a thermoplastic elastomer. The polymer mixture comprises a polyester-ester urethane or a polyether imide ester as a thermoplastic elastomer. The polymer mixtures according to the invention have good flow properties.

18 Claims, No Drawings

POLYMER MIXTURE HAVING AROMATIC POLYCARBONATE, POLYESTER AND THERMOPLASTIC ELASTOMER, ARTICLE FORMED THEREFROM

The invention relates to a polymer mixture which comprises an aromatic polycarbonate (A), a polyester built up entirely or substantially from units derived from an alkanediol and a benzene dicarboxylic acid (B), and a thermoplastic elastomer (C).

Polymer mixtures which comprise a copolyether ester, a polycarbonate and optionally a poly(alkylene terephthalate) are disclosed in EP-A-0150454. The known polymer mixture comprises 5-100 parts by weight of polycarbonate per 100 parts by weight of copolyether ester. When a polyester is used, the quantity thereof is preferably at most 70% by weight based on the combined weight of the polycarbonate and the polyester. According to this prior art the following properties of the polyether are improved by the addition of a polycarbonate and/or a polyester to polyether esters: the bending strength, the tensile strength and the processability, while maintaining the impact strength and the elongation.

Polymer mixtures which comprise a mixture of polybutylene terephthalate and polyethylene terephthalate and clay treated with silane; acicuar calcium metasilicate; a combination of a segmented copolyester and an aromatic polycarbonate or novaculite are described in US-A-4,203,887. By adding the last-mentioned constituents to the polyester mixture, this can more easily be processed. A polyether ester block copolymer is used as a segmented copolyester.

EP-A-0,192,065 describes polymer mixtures which comprise 30-90% by weight of polycarbonate, 4-45% by weight of a polyester ether elastomer and 2-40% by weight of a polyester. Moreover, the known polymer mixtures may comprise a rubber-like elastomer. The known mixtures have a good bending modulus, a good flow and have chemical resistance.

Polymer mixtures which comprise a polyether imide ester elastomer, a polyester, a rubber-like elastomer and a polycarbonate are described in the non-prepublished U.S. patent application Ser. No. 138,885.

The invention provides polymer mixtures which comprise an aromatic polycarbonate (A) and a polyester (B). It has been found that by the addition of comparatively small quantities of certain thermoplastic elastomers (C) an improvement of the flow properties can be obtained, while the remaining good mechanical properties and the chemical resistance are maintained.

The polymer mixture according to the invention is characterised in that the polymer mixture comprises a polyester-ester urethane or a polyether imide ester as a thermoplastic elastomer (C).

The polymer mixture according to the invention is preferably composed so that it comprises 40-80 parts by weight of aromatic polycarbonate (A), 10-50 parts by weight of polyester (B), and 1-10 parts by weight of thermoplastic polymer (C).

Within the above-indicated preferred range, two even more preferable ranges are present:
65-75 parts by weight of aromatic polycarbonate (A),
10-20 parts by weight of polyester (B), and
1-10 parts by weight of thermoplastic polymer (C).
45-55 parts by weight of aromatic polycarbonate (A),
30-40 parts by weight of polyester (B), and
1-10 parts by weight of thermoplastic elastomer (C).

All the above-mentioned quantities are calculated per 100 parts by weight of A+B+C.

As a polyester-ester urethane is preferably used a block copolymer which is built up from polyester-ester units which are bonded by means of groups of the formula $R_1[NHC(0)]_p$, wherein $R_1$ is a polyfunctional group having at most 30 carbon atoms and p has a value of 2 or 3, and in which the polyester-ester units are built up from blocks having a number of ester units of the formula $—OGOC(0)R_2C(0)—$ and blocks having a number of ester units which are capable of forming a bifunctional polyester or polyester amide having a melting-point lower than 100° C., which blocks are bonded together by means of ester bonds.

As a polyether imide ester is preferably used a block copolymer obtained by reaction of a diol having a low molecular weight, a dicarboxylic acid, a poly(oxyalkylene)diamine and a tricarboxylic acid or a derivative thereof.

The polymer mixture according to the invention may moreover comprise one or more conventionally used additives. In many cases it is to be preferred to use in the polymer mixture according to the invention an agent to improve the impact strength The invention also relates to articles formed from the polymer mixture according to the invention.

The polymer mixture according to the invention comprises at any rate the following constituents:
A. an aromatic polycarbonate,
B. a polyester built up entirely or substantially from units derived from an alkanediol and a benzene dicarboxylic acid, and
C. a polyester-ester urethane or a polyether imide ester.

A. Aromatic Polycarbonate

Aromatic polycarbonates are polymers known per se. They are generally prepared by reacting a dihydric phenol compound with a carbonate precursor, for example, phosgene, a halogen formate or a carbonate ester. Aromatic polycarbonates are polymers which comprise units of the formula

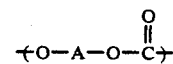

wherein A is a bivalent aromatic radical which is derived from the dihydric phenol used in the preparation of the polymer. Mononuclear or polynuclear aromatic compounds which comprise two hydroxy radicals which are each directly bonded to a carbon atom of an aromatic nucleus may be used as dihydric phenols in the preparation of the aromatic polycarbonates.

The known branched polycarbonates as for example, in US-A-4,001,184 are also suitable.

Suitable aromatic polycarbonates are also the so-called polyester carbonates which are obtained by carrying out the polymerisation reaction in the presence of an ester precursor, for example, a difunctional carboxylic acid, for example, terephthalic acid or an ester-forming derivative thereof. These polyester carbonates have ester compounds and carbonate compounds in the polymeric chain. Polyester carbonates are described, for example, in US-A-3,169,121.

B. Polyester

The invention relates to polymer mixtures which comprise a polyester having units derived from an alkanediol and a benzene dicarboxylic acid. The polyester may comprise units derived from one or more alkanediol compounds. The polyester may also comprise units derived from one or more benzene dicarboxylic acids. In addition to the alkanediol the polyester may comprise units derived from one or more other diol compounds or polyol compounds.

The polyester generally comprises an excess of units derived from an alkanediol with respect to the optionally present units derived from other diol compounds or polyol compounds. Suitable alkanediol compounds are, for example, ethane-diol or butane-1,4-diol. In addition to units derived from benzene dicarboxylic acids the polyester may also comprise units derived from other dicarboxylic acids or polycarboxylic acids. However, the greater part of the units derived from acids is derived from an aromatic dicarboxylic acid. Suitable benzene dicarboxylic acids are terephthalic acid and isophthalic acid.

A polyester having more than 70 mol % of units derived from terephthalic acid and butane-1,4-diol is preferably used as a polyester. It is also possible to use two or more different polyesters.

C. Polyester-Ester Urethane or Polyether Imide Ester

Polyester-ester urethanes are known per se. They are usually built up from polyester-ester units which are bonded by means of groups of the formula $R_1[NHC](0)_p$, wherein $R_1$ is a polyfunctional group having at most 30 carbon atoms and p has the value 2 or 3, and in which the polyester-ester units are built up from blocks having a number of ester units of the formula —OGOC(0)$R_2$C(0)— and blocks having a number of ester units which are capable of forming a bifunctional polyester or polyester amide having a melting-point lower than 100° C., which blocks are bonded together by means of ester bonds, at least 80 mol % of the $R_2$ groups being 1,4-phenylene radicals and at least 80 mol % of the G-groups being a tetra methylene group.

Such polymers and their modes of preparation are described, for example, in EP-A-0102115, U.S. Pat. Nos. 4,186,257 and 4,228,249.

Polyether imide esters are also known per se. They are usually obtained by reaction of a diol having a low molecular weight, a dicarboxylic acid, a poly(oxyalkylene) diamine and a tricarboxylic acid or a derivative thereof. Such polymers are described, for example, in U.S. Pat. Nos. 4,544,734, 4,556,705 and 4,556,688.

In addition to the constituents mentioned hereinbefore the polymer mixture according to the invention may also comprise conventionally used additives. Suitable additives are pigments and dyes, reinforcing fibres, stabilisers, transesterification inhibitors, flame retardants, mould release agents, etc. The polymer mixture according to the invention preferably comprises an agent to improve the impact strength.

The polymer mixture according to the invention can be obtained according to any method conventionally used for the preparation of polymer mixtures. The polymer mixtures according to the invention are preferably prepared by compounding the individual constituents in an extruder.

EXAMPLES

The following constituents were used in the examples:

| | |
|---|---|
| PC-1: | an aromatic polycarbonate derived from bisphenol A and phosgene having an intrinsic viscosity of 49 dl/g measured in methylene chloride at 25° C. |
| PC-2: | an aromatic polycarbonate derived from bisphenol A and phosgene having an intrinsic viscosity of 47 dl/g measured in methylene chloride at 25° C. |
| PC-3: | an aromatic polycarbonate derived from bisphenol A and phosgene having an intrinsic viscosity of 53 dl/g measured in methylene chloride at 25° C. |
| PBT-1: | a polyester derived from butanediol and terephthalic acid having an intrinsic viscosity of 0.86 dl/g measured in a 60/40 mixture of phenol/tetrachloroethane at 25° C. |
| PBT-2: | a polyester derived from butanediol and terephthalic acid having an intrinsic viscosity of 1-18 dl/g measured in a 60/40 mixture of phenol/tetrachloroethane at 25° C. |
| TPE-1: | a polyester-ester urethane commercially available as ARNITEL ® UM550. |
| TPE-2: | a polyether imide ester commercially available from General Electric as LOMOD ® J10. |
| IM: | an agent to improve the impact strength based on a core-shell graft polymer having a rubber-like core built up substantially from a butadiene rubber and a hard shell (in powder form). |
| ST-1: | a first mixture of stabilisers. |
| ST-2: | a second mixture of stabilisers. |
| PE: | a polyethylene. |
| Pig: | a mixture of pigments. |
| K: | a polymer based on (meth)acrylates. |
| EXL: | a similar agent to IM to improve the impact strength, (in pellet form). |

The constituents mentioned hereinbefore were compounded in the quantities as indicated hereinafter in a single-blade extruder, adjusted at an average temperature of approximately 250° C., and processed to pellets.

The following properties of the resulting polymer mixtures were determined: the melt viscosity at 280° C. and at various shearing rates (according to DIN 54811), the melt viscosity index at 265° C., under a load of 12N (according to ASTM 1238), the Izod notched impact strength at various temperatures (according to ASTM D256) and the Vicat B value (according to ASTMD 1525).

The results are recorded in the table hereinafter.

TABLE

| | Example No. (parts by weight) | | | | | | | | | |
|---|---|---|---|---|---|---|---|---|---|---|
| | A | B | I | II | III | IV | V | VI | VII | VIII |
| PC-1 | 69.6 | — | 64.6 | 69.6 | 64.6 | 69.6 | — | — | — | — |
| PC-2 | — | — | — | — | — | — | 64.6 | 64.6 | — | — |
| PC-3 | — | 52.9 | — | — | — | — | — | — | 53.1 | 48.1 |
| PBT-1 | 15 | — | 15 | 15 | 15 | 15 | 15 | 15 | — | — |
| PBT-2 | — | 39 | — | — | — | — | — | — | 34 | 39 |
| TPE-1 | — | — | — | — | 5 | 5 | — | 5 | — | — |
| TPE-2 | — | — | 5 | 5 | — | — | 5 | — | 4.7 | 4.7 |

TABLE-continued

| | \multicolumn{10}{c}{Example No. (parts by weight)} | | | | | | | | | |
|---|---|---|---|---|---|---|---|---|---|---|
| | A | B | I | II | III | IV | V | VI | VII | VIII |
| IM | 5 | — | 5 | — | 5 | — | 5 | 5 | — | — |
| ST-1 | 0.6 | — | 0.6 | 0.6 | 0.6 | 0.6 | 0.6 | 0.6 | — | — |
| ST-2 | — | 0.7 | — | — | — | — | — | — | 0.7 | 0.7 |
| P | 2 | — | 2 | 2 | 2 | 2 | 2 | 2 | — | — |
| K | 5 | — | 5 | 5 | 5 | 5 | 5 | 5 | — | — |
| EXL | — | 7.5 | — | — | — | — | — | — | 7.5 | 7.5 |
| Pig | 1 | — | 1 | 1 | 1 | 1 | 1 | 1 | — | — |
| Properties | | | | | | | | | | |
| Melt viscosity (Pa.s) | | | | | | | | | | |
| at 115 per s. | | 824 | | | | | | | 692 | 678 |
| at 574 per s. | 235 | 535 | 180 | 187 | 181 | 160 | 184 | 157 | 453 | 440 |
| at 1500 per s. | 191 | 334 | 148 | 144 | 144 | 133 | 136 | 124 | 293 | 284 |
| Melt viscosity Index (cc per 10 min.) | 6.2 | | 7.8 | 9.8 | 8.3 | 11.2 | 9.7 | 10.5 | | |
| Izod impact strength (J/m) | | | | | | | | | | |
| room temp. | 734 | | 694 | 135 | 711 | 139 | 654 | 736 | | |
| at 0° C. | 561 | | 365 | | 355 | | 176 | 174 | | |
| −10° C. | 433 | | | | | | | | | |
| −20° C. | | 676 | | | | | | | 610 | 576 |
| −30° C. | | 570 | | | | | | | 564 | 201 |
| −40° C. | | 194 | | | | | | | 262 | 171 |
| Vicat-B (°C.) | 120 | 126 | 110 | 113 | 109 | 110 | 112 | 109 | 116 | 118 |

It may be seen from the results recorded in the table hereinbefore that the addition of a comparatively small quantity (5 parts by weight) of a thermoplastic polymer TPE-1 or TPE-2 leads to an improvement of the flow properties.

We claim:

1. A polymer mixture which comprises 40-80 parts by weight of an aromatic polycarbonate (A), 10-50 parts by weight of a polyester built up entirely or substantially from units derived from an alkanediol and a benzene dicarboxylic acid (B), and 1-10 parts by weight of a thermoplastic elastomer (C), calculated per 100 parts by weight of A+B+C, characterized in that the thermoplastic elastomer (C) is built up from polyester units which are bonded by means of groups of the formula $R_1[NHC(O)]p$, wherein $R_1$ is a polyfunctional group having at most 30 carbon atoms and p has a value of 2 or 3, and in which the polyester units are built up from blocks having a number of ester units of the formula —OGOC(O)R$_2$C(O)— and blocks having a number of ester units which are capable of forming a bifunctional polyester or polyester amide having a melting-point lower than 100° C., which blocks are bonded together by ester bonds, at least 80 mol % of the R$_2$-groups being 1,4-phenylene radicals and at least 80 mol % of the G-groups being a tetra methylene group.

2. A polymer mixture claimed in claim 1, characterised in that the polymer mixture comprises in addition one or more conventionally used additives.

3. A polymer mixture as claimed in claim 2, chacterised in that the polymer mixture comprises in addition an agent to improve the impact strength.

4. Articles formed from the polymer mixture as claimed in claim 1.

5. A polymer mixture which comprises 67-75 parts by weight of an aromatic polycarbonate (A), 10-20 parts by weight of a polyester built up entirely or substantially from units derived from an alkanediol and benzene dicarboxylic acid (B), and 1-10 parts by weight of a thermoplastic elastomer (C), calculated per 100 parts by weight of A+B+C, characterized in that the thermoplastic elastomer (C) is built up from polyester units which are bonded by means of groups of the formula $R_1[NHC(O)]p$, wherein $R_1$ is a polyfunctional group having at most 30 carbon atoms and p has a value of 2 or 3, and in which the polyester units are built up from blocks having a number of ester units in the formula —OGOC(O)R$_2$C(O)— and blocks having a number of ester units which are capable of forming a bifunctional polyester or polyester amide having a melting-point lower than 100° C., which blocks are bonded together by ester bonds, at least 80 mol % of the R$_2$-groups being 1,4-phenylene radicals and at least 80 mol % of the G-groups being a tetra methylene group.

6. A polymer mixture as claimed in claim 5, characterised in that the polymer mixture comprises in addition one or more conventionally used additives.

7. A polymer mixture as claimed in claim 6, characterised in that the polymer mixture comprises in addition an agent to improve the impact strength.

8. Articles formed from the polymer mixture as claimed in claim 5.

9. A polymer mixture which comprises 45-55 parts by weight of an aromatic polycarbonate (A), 30-40 parts by weight of a polyester built up entirely or substantially from units derived from an alkanediol and a benzene dicarboxylic acid (B), and 1-10 parts by weight of a thermoplastic elastomer (C), calculated per 100 parts by weight of A+B+C, characterized in that the thermoplastic elastomer (C) is built up from polyester units which are bonded by means of groups of the formula $R_1[NHC(O)]p$, wherein $R_1$ is a polyfunctional group having at most 30 carbon atoms and p has a value of 2 or 3, and in which the polyester-ester units are built up from blocks having a number of ester units of the formula —OGOC(O)R$_2$C(O)— and blocks having a number of ester units which are capable of forming a bifunctional polyester or polyester amide having a melting-point lower than 100° C., which blocks are bonded together by ester bonds, at least 80 mol % of the R$_2$-groups being 1,4-phenylene radicals and at least 80 mol % of the G-groups being a tetra methylene group.

10. A polymer mixture as claimed in claim 9, characterised in that the polymer mixture comprises in addition one or more conventionally used additives.

11. A polymer mixture as claimed in claim 10, characterised in that the polymer mixture comprises in addition an agent to improve the impact strength.

12. Articles formed from the polymer mixture as claimed in claim 9.

13. A process for improving the flow properties of a polymer mixture of about 40 to about 80 parts by weight of an aromatic polycarbonate (A) and about 10 to about 50 parts by weight of a polyester built up substantially from units derived from an alkanediol and a benzene dicarboxylic acid (B), comprising, addition about 1 to about 10 parts by weight of a thermoplastic elastomer (C) to the polymer mixture to improve the melt viscosity of the polymer mixture, the parts by weight of thermoplastic elastomer (C) being calculated per 100 parts by weight of (A)+(B)+(C), wherein the thermoplastic elastomer (C) is a polyester urethane built up from polyester units which are bonded by means of groups of the formula $R_1[NHC(O)]p$, wherein $R_1$ is polyfunctional group having at most 30 carbon atoms, and p has a value of 2 or 3, the polyester units being built up from blocks having a number of ester units of the formula:

—OGOC(O)$R_2$C(O)— and block having a number of ester units which are capable of forming a bifunctional polyester or polyester amide having a melting point lower than 100° C., which blocks are bonded together by ester bonds, at least 80 mol % of the $R_2$-groups being 1,4-phenylene radicals and at least 80 mol % of the G-group being tetramethylene group.

14. The process of claim 13, further comprising adding one or more additives selected from the group consisting of pigment, dye, reinforcing fiber, stabiliser, transesterification inhibitor, flame retardant, mold release agent and an agent to improve the impact strength.

15. A process for improving the flow properties of a polymer mixture of about 65 to about 75 parts by weight of an aromatic polycarbonate (A) and about 10 to about 20 parts by weight of a polyester built up substantially from units derived from alkanediol and a benzene dicarboxylic acid (B) comprising, adding about 1 to about 10 parts by weight of a thermoplastic elastomer (C) to the polymer mixture to improve the melt viscosity of the polymer mixture, the parts of weight of thermoplastic elastomer (C) being calculated per 100 parts by weight of (A)+(B)+(C), wherein the thermoplastic elastomer (C) is a polyester urethane built up from polyester units which are bonded by means of groups of the formula $R_1[NHC(O)]p$, wherein $R_1$ is a polyfunctional group having at most 30 carbon atoms, and p has a value of 2 or 3, the polyester-[ester] units being built up from blocks having a number of ester units of the formula:

—OGOC(O)$R_2$C(O)— and blocks having a number ester units which are capable of forming a bifunctional polyester or polyester amide having a melting point lower than 100° C., which blocks are bonded together by ester bonds, at least 80 mol % of the $R_2$-groups being 1,4-phenylene radicals and at least 80 mol % of the G-groups being a tetramethylene group.

16. The process of claim 15 further comprising one or more additives selected from the group consisting of pigment, dye, reinforcing fiber, stabiliser, transesterification inhibitor, flame retardant, mold release agent and an agent to improve the impact strength.

17. A process for improving the flow properties of a polymer mixture of about 45 to about 55 parts by weight of an aromatic polycarbonate (A) and about 30 to about 40 parts by weight of a polyester built up substantially from units derived from an alkanediol and a benzene dicarboxylic acid (B) comprising, adding about 1 to about 10 parts by weight of a thermoplastic elastomer (C) to the polymer mixture to improve the melt viscosity of the polymer mixture, the parts by weight of thermoplastic elastomer (C) being calculated per 100 parts by weight of (A)+(B)+(C), wherein the thermoplastic elastomer (C) is a polyester urethane built up from polyester units which are bonded by means of groups of the formula $R_1[NHC(O)]p$, wherein $R_1$ is a polyfunctional group having at most 30 carbon atoms, and p has a value of 2 or 3, the polyester units being built up from blocks having a number of ester units of the formula:

—OGOC(O)$R_2$C(O)— and blocks having a number of ester units which are capable of forming a bifunctional polyester or polyester amide having a melting point lower than 100° C., which blocks are bonded together by ester bonds, at least 80 mol % of the $R_2$-groups being 1,4-phenylene radicals and at lest 80 mol % of the G-groups being a tetramethylene group.

18. The process of claim 17 further comprising one or more additives selected from the group consisting of pigment, dye, reinforcing fiber, stabiliser, transesterification inhibitor, flame retardant, mold release agent and an agent to improve the impact strength.

* * * * *